US011934810B2

(12) United States Patent
Wengier et al.

(10) Patent No.: US 11,934,810 B2
(45) Date of Patent: Mar. 19, 2024

(54) TRANSLATING AN EDIT FROM A CHILD COMPUTER LANGUAGE TO A PARENT COMPUTER LANGUAGE WHILE MAINTAINING A SEMANTIC MEANING OF THE EDIT

(71) Applicant: Microsoft Technology Licensing, LLC, Redmond, WA (US)

(72) Inventors: David Wengier, Melbourne (AU); Nicholas Taylor Mullen, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 119 days.

(21) Appl. No.: 17/749,089

(22) Filed: May 19, 2022

(65) Prior Publication Data

US 2023/0376288 A1    Nov. 23, 2023

(51) Int. Cl.
*G06F 8/41* (2018.01)
*G06F 8/65* (2018.01)

(52) U.S. Cl.
CPC . *G06F 8/42* (2013.01); *G06F 8/65* (2013.01)

(58) Field of Classification Search
CPC ..................................... G06F 8/42; G06F 8/65
See application file for complete search history.

(56) References Cited

U.S. PATENT DOCUMENTS

| 7,165,244 | B2 * | 1/2007 | Maine | G06F 8/51 |
| | | | | 717/137 |
| 11,481,200 | B1 * | 10/2022 | Huang | G06F 8/51 |
| 11,775,271 | B1 * | 10/2023 | Singh | G06N 3/04 |
| | | | | 717/137 |
| 2009/0164973 | A1 * | 6/2009 | Barnett | G06F 8/51 |
| | | | | 717/110 |

(Continued)

FOREIGN PATENT DOCUMENTS

CN          104823161 A  *  8/2015   ............ G06F 21/14

OTHER PUBLICATIONS

Mullen, et al., "Expand Razor edit re-mapping to be more intelligent #6159", Retrieved from: https://github.com/dotnet/razor-tooling/issues/6159, Mar. 9, 2022, 4 Pages.

(Continued)

*Primary Examiner* — Phillip H Nguyen
(74) *Attorney, Agent, or Firm* — Wade IP Law PLLC

(57) ABSTRACT

Techniques are described herein that are capable of translating an edit from a child computer language to a parent computer language while maintaining a semantic meaning of the edit. Parent code that is based on the parent computer language is compiled, which automatically triggers generation of child code that is mapped to the parent code and that is based on the child computer language. A determination is made that the edit, which is not mapped to the parent code, is implemented in the child code to provide edited child code. The parent code is updated to include a change that is based on the semantic meaning of the edit. The updated (Continued)

parent code is configured such that compilation of the updated parent code automatically triggers generation of an updated version of the child code that includes the semantic meaning of the edit.

20 Claims, 6 Drawing Sheets

(56) References Cited

U.S. PATENT DOCUMENTS

2014/0189662 A1* 7/2014 Mameri .................. G06F 8/427
717/136
2016/0350204 A1* 12/2016 Conlon ..................... G06F 9/54

OTHER PUBLICATIONS

Wengier, et al., "Automatically add using directives from code actions etc. #5770", Retrieved from: https://github.com/dotnet/razor-tooling/pull/5770, Nov. 23, 2021, 5 Pages.

* cited by examiner

TRANSLATING AN EDIT FROM A CHILD COMPUTER LANGUAGE TO A PARENT COMPUTER LANGUAGE WHILE MAINTAINING A SEMANTIC MEANING OF THE EDIT

BACKGROUND

When a user writes parent code in a parent computer language, compilation of the parent code may generate child code in one or more child computer languages. For instance, if the parent code is written in a Razor computer language, the child code may be generated in any of the following computer languages: hypertext markup language (HTML), JavaScript®, cascading style sheets (CSS), and/or C#. In conventional techniques for generating child code based on parent code, a one-way mapping exists from the parent code to a portion of the child code. The child code associated with each child computer language typically is parsed and validated by language services that are specific to that child computer language. The language services traditionally are not able to apply edits, which are applied to the child code, to the parent code if the edits are outside the mapped portion of the child code. The conventional techniques often limit possible edits to those that are enumerated in a list that is presented to the user. Limiting the possible edits in this manner may cause the capabilities of the parent computer language to lag behind the capabilities of the child computer languages with regard to the types of edits that are supported. Accordingly, the parent code may be vulnerable to breaking if the way in which the existing known edits work changes.

SUMMARY

Various approaches are described herein for, among other things, translating an edit from a child computer language to a parent computer language while maintaining a semantic meaning of the edit. A child computer language is a computer language on which child code is based (e.g., a computer language in which the child code is written). A parent computer language is a computer language on which parent code is based (e.g., a computer language in which the parent code is written). Child code is code that is generated by compiling parent code. Parent code is code that is capable of being compiled to generate child code. When an edit is made to child code that is written in a child computer language, parent code that is written in a parent computer language may be changed in a manner that captures the semantic meaning of the edit. The changed parent code may be compiled to automatically generate an updated version of the child code that includes the semantic meaning of the edit.

In a first example approach, parent code that is based on a parent computer language is compiled. Compiling the parent code automatically triggers generation of child code that is mapped to the parent code and that is based on a child computer language. A determination is made that an edit, which is not mapped to the parent code, is implemented in the child code to provide edited child code. The edit is translated from the child computer language to the parent computer language by updating the parent code to include a change that is based on (e.g., based at least in part on) a semantic meaning of the edit. The updated parent code is configured such that compilation of the updated parent code automatically triggers generation of an updated version of the child code that includes the semantic meaning of the edit.

In a second example approach, an initial version of parent code that is based on a parent computer language is compiled. Compiling the initial version of the parent code automatically triggers generation of child code that is mapped to the parent code and that is based on a child computer language. A determination is made that an edit, which is not mapped to the parent code, is performed on a portion of the child code to provide an edited portion of the child code. An updated version of the parent code, which incorporates a change with reference to the initial version of the parent code, is generated such that the change is based on a difference between a semantic meaning of the portion of the child code and a semantic meaning of the edited portion of the child code. The updated version of the parent code is configured such that compilation of the updated version of the parent code automatically triggers generation of an updated version of the child code that includes the semantic meaning of the edited portion of the child code.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
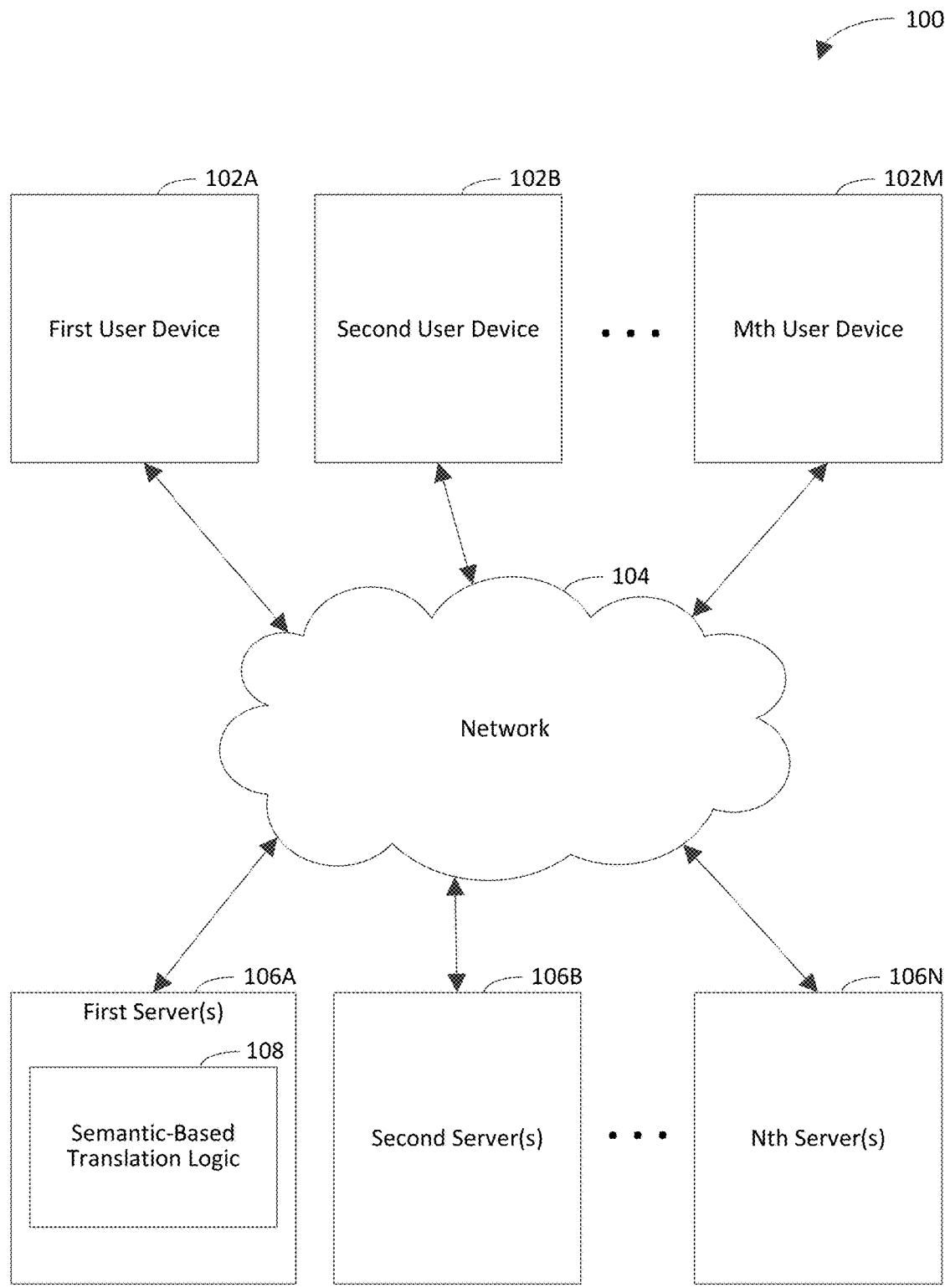
FIG. 1 is a block diagram of an example semantic-based translation system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of translating an edit from a child computer language to a parent computer language while maintaining a semantic meaning of the edit. A child computer language is a computer language on which child code is based (e.g., a computer language in which the child code is written). A parent computer language is a computer language on which parent code is based (e.g., a computer language in which the parent code is written). Child code is code that is generated by compiling parent code. Parent code is code that is capable of being compiled to generate child code. When an edit is made to child code that is written in a child computer language, parent code that is written in a parent computer language may be changed in a manner that captures the semantic meaning of the edit. The changed parent code may be compiled to automatically generate an updated version of the child code that includes the semantic meaning of the edit.

For example, the parent code may include the following snippet, which is based on the Razor computer language:

```
@code
{
  // code here
}
```

In accordance with this example, the snippet may generate the following child code based on the C# computer language for consumption by C# language services:

```
using System;
class RazorPage
{
  Public void Render( )
  {
    // code here
  }
}
```

If the C# computer services want to edit the child code to add a new "using" statement to the list of usings at the top of a file that includes the child code, the new using statement will be outside the mapped area. By utilizing any one or more of the example techniques described herein, the semantic meaning of the using statement may be determined, and a using directive that includes the semantic meaning may be added to the parent code. For instance, the example techniques may use the C# computer services to analyze the file and to understand the contents of the file semantically. Adding the using directive to the parent code configures the parent code to automatically generate an updated version of the child code, which includes a using statement that includes the semantic meaning, when the parent code is compiled. In particular, compilation of the using directive causes the using statement having the semantic meaning to be automatically generated. This example is provided for illustrative purposes and is not intended to be limiting.

Example techniques described herein have a variety of benefits as compared to conventional techniques for generating child code based on parent code. For instance, the example techniques may be capable of expanding the types of changes that a downstream language service is allowed to suggest without the downstream language service needing to know the type of parent code on which the child code is based and/or without needing the parent computer language on which the parent code is based to understand all of the possible types of edits that the downstream language service might want to apply. For instance, the downstream language service may be unrestricted in the types of changes that the downstream language service is allowed to suggest. By semantically understanding edits from downstream language services, and with knowledge of the code generation process, the parent computer language may be capable of incorporating a semantic equivalent of any edit from a child computer language into the parent computer language, even if the way the edit works changes, so long as the parent computer language understands the language constructs of the child computer language. Accordingly, the example techniques may be resilient to changes in how existing known edits work. The example techniques may support extensions to child computer languages that are capable of supplying new edits (e.g., new types of edits). The example techniques may obviate a need to discard edits to child code that are outside a portion of the child code to which the parent code is mapped.

Child computer languages need not necessarily be aware of the parent computer language. The parent computer language need not necessarily be aware of a syntax of the child computer languages.

The example techniques may reduce an amount of time and/or resources (e.g., processor cycles, memory, network bandwidth) that is consumed to modify parent code to incorporate functionality that results in a desired edit in child code that is generated when the parent code is compiled. For instance, the desired edit may have the same semantic meaning as (e.g., may be semantically equivalent to) an edit that is suggested by a downstream language service or a user. The example techniques may automate updating the parent code to incorporate the functionality that results in the desired edit in the child code. Automating the updating of the parent code may increase efficiency of a computing system that is used to update the parent code. Automating the updating of the parent code may increase efficiency and/or a user experience of a user who would otherwise manually update the parent code to incorporate the functionality. For instance, the example techniques may eliminate a need for the user to perform manual operations to determine the functionality that is to be incorporated into the parent code so that compilation of the parent code results in child code that includes the desired edit.

FIG. 1 is a block diagram of an example semantic-based translation system 100 in accordance with an embodiment. Generally speaking, the semantic-based translation system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the semantic-based translation system 100 translates an edit from a child computer language to a parent computer language while maintaining a semantic meaning of the edit. Detail regarding techniques for translating an edit from a child computer language to a parent computer language while maintaining a semantic meaning of the edit is provided in the following discussion.

As shown in FIG. 1, the semantic-based translation system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are processing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. One example type of computer program that may be executed by one or more of the servers 106A-106N is a developer tool. A developer tool is a computer program that performs diagnostic operations (e.g., identifying source of problem, debugging, profiling, controlling, etc.) with respect to program code. Examples of a developer tool include but are not limited to an integrated development environment (IDE) and a web development platform. Examples of an IDE include but are not limited to Microsoft Visual Studio® IDE developed and distributed by Microsoft Corporation; AppCode® IDE, PhpStorm® IDE, Rider® IDE, WebStorm® IDE, etc. developed and distributed by JetBrains s.r.o.; JDeveloper® IDE developed and distributed by Oracle International Corporation; NetBeans® IDE developed and distributed by Sun Microsystems, Inc.; Eclipse™ IDE developed and distributed by Eclipse Foundation; and Android Studio™ IDE developed and distributed by Google LLC and JetBrains s.r.o. Examples of a web development platform include but are not limited to Windows Azure® platform developed and distributed by Microsoft Corporation; Amazon Web Services® platform developed and distributed by Amazon.com, Inc.; Google App Engine® platform developed and distributed by Google LLC; VMWare® platform developed and distributed by VMWare, Inc.; and Force.com® platform developed and distributed by Salesforce, Inc. It will be recognized that the example techniques described herein may be implemented using a developer tool. In accordance with some example embodiments, the servers 106A-106N are configured to host respective Web sites, so that the Web sites are accessible to users of the semantic-based translation system 100.

The first server(s) 106A are shown to include semantic-based translation logic 108 for illustrative purposes. The semantic-based translation logic 108 is configured to translate an edit from a child computer language to a parent computer language while maintaining a semantic meaning of the edit. In a first example implementation, the semantic-based translation logic 108 compiles parent code that is based on the parent computer language, which automatically triggers generation of child code that is mapped to the parent code and that is based on the child computer language. The semantic-based translation logic 108 determines that the edit, which is not mapped to the parent code, is implemented in the child code to provide edited child code. The semantic-based translation logic 108 translates the edit from the child computer language to the parent computer language by updating the parent code to include a change that is based on the semantic meaning of the edit. The updated parent code is configured such that compilation of the updated parent code automatically triggers generation of an updated version of the child code that includes the semantic meaning of the edit.

In a second example implementation, the semantic-based translation logic 108 compiles an initial version of parent code that is based on the parent computer language, which automatically triggers generation of child code that is mapped to the parent code and that is based on the child computer language. The semantic-based translation logic 108 determines that the edit, which is not mapped to the parent code, is performed on a portion of the child code to provide an edited portion of the child code. The semantic-based translation logic 108 generates an updated version of the parent code, which incorporates a change with reference to the initial version of the parent code, such that the change is based on a difference between a semantic meaning of the portion of the child code and a semantic meaning of the edited portion of the child code. The updated version of the parent code is configured such that compilation of the updated version of the parent code automatically triggers generation of an updated version of the child code that includes the semantic meaning of the edited portion of the child code.

The semantic-based translation logic 108 may be implemented in various ways to translate an edit from a child computer language to a parent computer language while maintaining a semantic meaning of the edit, including being implemented in hardware, software, firmware, or any combination thereof. For example, the semantic-based translation logic 108 may be implemented as computer program code configured to be executed in one or more processors. In another example, at least a portion of the semantic-based translation logic 108 may be implemented as hardware logic/electrical circuitry. For instance, at least a portion of the semantic-based translation logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

It will be recognized that the semantic-based translation logic 108 may be (or may be included in) a developer tool, though the scope of the example embodiments is not limited in this respect.

The semantic-based translation logic 108 is shown to be incorporated in the first server(s) 106A for illustrative purposes and is not intended to be limiting. It will be recognized that the semantic-based translation logic 108 (or any portion(s) thereof) may be incorporated in any one or more of the user devices 102A-102M. For example, client-side aspects of the semantic-based translation logic 108 may be incorporated in one or more of the user devices 102A-102M, and server-side aspects of semantic-based translation logic 108 may be incorporated in the first server(s) 106A. In another example, the semantic-based translation logic 108 may be distributed among the user devices 102A-102M. In yet another example, the semantic-based translation logic 108 may be incorporated in a single one of the user devices 102A-102M. In another example, the semantic-based translation logic 108 may be distributed among the server(s) 106A-106N. In still another example, the semantic-based translation logic 108 may be incorporated in a single one of the servers 106A-106N.

FIG. 2-5 depict flowcharts 200, 300, 400, and 500 of example methods for translating an edit from a child computer language to a parent computer language while maintaining a semantic meaning of the edit in accordance with embodiments. Flowcharts 200, 300, 400, and 500 may be performed by the first server(s) 106A shown in FIG. 1, for example. For illustrative purposes, flowcharts 200, 300, 400, and 500 are described with respect to computing system 600 shown in FIG. 6, which is an example implementation of the first server(s) 106A. As shown in FIG. 6, the computing system 600 includes semantic-based translation logic 608 and a store 610. The semantic-based translation logic 608 includes a compiler 612, edit determination logic 614, and code update logic 616. The code update logic 616 includes semantic analysis logic 618 and location correspondence logic 620. The store 610 may be any suitable type of store.

One type of store is a database. For instance, the store 610 may be a relational database, an entity-relationship database, an object database, an object relational database, an extensible markup language (XML) database, etc. The store 610 is shown to store code snippet information 628 for non-limiting, illustrative purposes. Further structural and operational embodiments will be apparent to persons skilled in the relevant art(s) based on the discussion regarding flowcharts 200, 300, 400, and 500.

Figure 2:
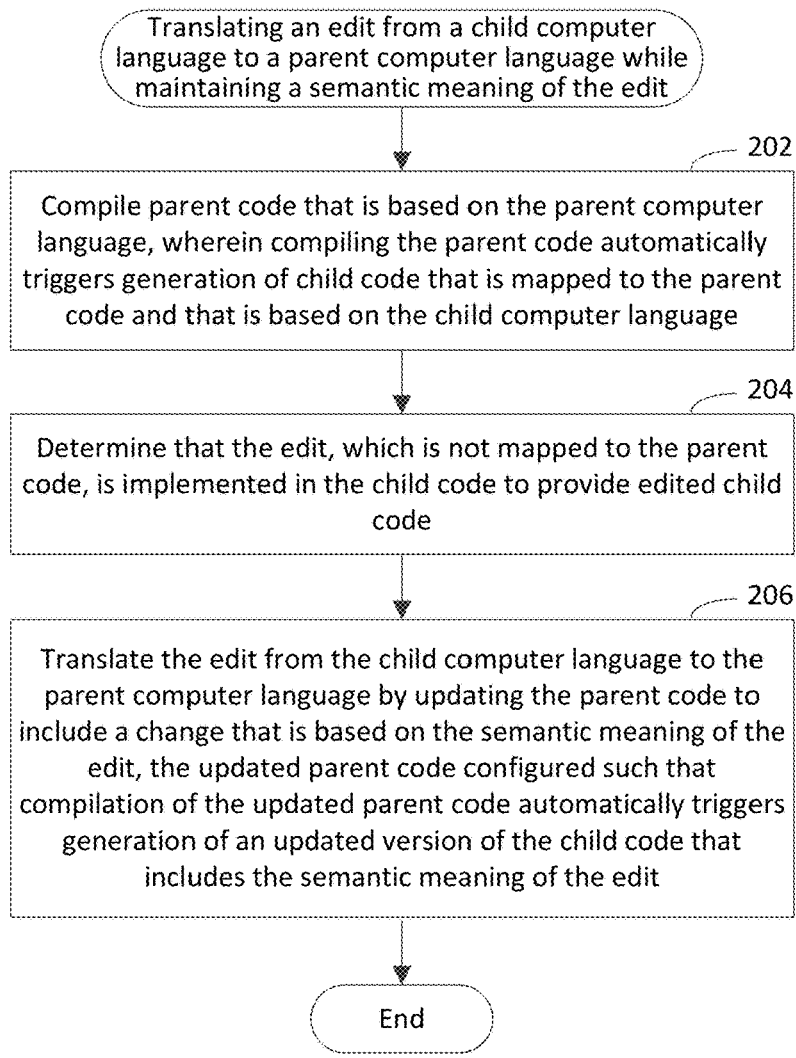
FIG. 2-5 depict flowcharts of example methods for translating an edit from a child computer language to a parent computer language while maintaining a semantic meaning of the edit in accordance with embodiments.

As shown in FIG. 2, the method of flowchart 200 begins at step 202. In step 202, parent code that is based on the parent computer language is compiled. Compiling the parent code at step 202 automatically triggers generation of child code that is mapped to the parent code and that is based on the child computer language. In an example implementation, the compiler 612 compiles parent code 622, which is based on the parent computer language. By compiling the parent code, the compiler 612 automatically triggers generation of child code 624, which is mapped to the parent code 622 and which is based on the child computer language.

Examples of a parent computer language include but are not limited to Razor, extensible application markup language (XAML), hypertext markup language (HTML), and TypeScript. Examples of a child computer language include but are not limited to C# and JavaScript®. For example, the parent computer language may be Razor, and the child computer language may be C#. In another example, the parent computer language may be XAML, and the child computer language may be C#. In yet another example, the parent computer language may be HTML, and the child computer language may be JavaScript®. In still another example, the parent computer language may be TypeScript, and the child computer language may be JavaScript®.

At step 204, a determination is made that the edit, which is not mapped to the parent code, is implemented (e.g., manually implemented) in the child code to provide edited child code. In an example implementation, the edit determination logic 614 determines that the edit is implemented in the child code 624, resulting in the edited child code. In accordance with this implementation, the edit is not mapped to the parent code 622. For instance, the edit may be outside the Mine pragmas in the child code that the compiler 612 generates. The edit determination logic 614 may generate edit information 626 to include information about the edit (e.g., a description of the edit). For instance, the edit information 626 may indicate functionality that is included in the edit, a line in the child code 624 at which the edit is implemented, copies of the child code before the edit is implemented and after the edit is implemented, and/or a copy of the edit itself.

At step 206, the edit is translated from the child computer language to the parent computer language by updating the parent code to include a change that is based on the semantic meaning of the edit. For instance, the edit and the change may be semantically equivalent. The updated parent code is configured such that compilation of the updated parent code automatically triggers generation of an updated version of the child code that includes the semantic meaning of the edit. In an example implementation, the code update logic 616 translates the edit from the child computer language to the parent computer language by updating the parent code 622 to include the change, which is based on the semantic meaning of the edit. The code update logic 616 configures the resulting updated parent code 630 to, as a result of the updated parent code 630 being compiled, automatically trigger generation of the updated version of the child code, which includes the semantic meaning of the edit.

In an example embodiment, the semantic analysis logic 618 analyzes the edit information 626 to determine the semantic meaning of the edit. For example, the code update logic 616 may analyze a syntax of the edit, a syntax of the child code 624, and/or a context of the edit to identify the semantic meaning of the edit. The context of the edit may be based on portion(s) of the child code 624 that are changed by the edit and/or portion(s) of the child code 624 having an input that is affected by the edit. The semantic analysis logic 618 may determine the semantic meaning of the edit based on rules for interpreting the syntax of the edit and/or the child code 624 that constrain the possible interpretations of the edit. The semantic analysis logic 618 may use any suitable technique for determining the semantic meaning of the edit, including but not limited to an operational semantics technique, a denotational semantics technique, and/or an axiomatic semantics technique. In accordance with the operational semantics technique, the semantic analysis logic 618 may determine the semantic meaning of the edit based on the computation that the edit induces when the updated child code is executed on a machine (e.g., the computing system 600).

Accordingly, the semantic analysis logic 618 may determine the semantic meaning based on how the effect of the computation is produced. In accordance with the denotational semantics technique, the semantic analysis logic 618 may determine the semantic meaning of the edit by using mathematical objects that represent the effect of executing the edit to model the semantic meaning. Accordingly, the semantic analysis logic 618 may focus on the effect, rather than how the effect is produced.

In an example embodiment, translating the edit from the child computer language to the parent computer language as set forth in step 206 reduces an amount of time and/or resources (e.g., processor cycles, memory, network bandwidth) that is consumed to modify the parent code to incorporate functionality that results in the desired edit in the child code. In another example embodiment, translating the edit from the child computer language to the parent computer language as set forth in step 206 increases efficiency of a computing system (e.g., computing system 600) that is used to update the parent code (e.g., by automating the updating of the parent code).

In a parent file embodiment, a parent file includes the parent code and multiple code snippets that are based on respective child computer languages. In accordance with this embodiment, compiling the parent code at step 202 includes automatically triggering generation of child files that include the respective code snippets. It will be recognized that the child files may include additional code (e.g., classes, namespaces) beyond the code snippets. For instance, the additional code may be generated in the process of consuming the parent file. The additional code may include code that is required by a rendering engine, code that is required by a child computer language on which the corresponding code snippet is based, or any other suitable code. In an example implementation, the code snippets are written by a user of the parent file, and the additional code is not written by the user of the parent file. In further accordance with this embodiment, a designated child file of the child files includes the child code.

In an aspect of the parent file embodiment, the child code includes a designated code snippet of the code snippets. In accordance with this aspect, a portion of the child code in which the edit is implemented is separate from (e.g., not included in) the designated code snippet.

The child computer language may be an embedded computer language that is embedded in the parent computer language, though the scope of the example embodiments is not limited in this respect. For instance, in the parent file embodiment, the code snippets may be intermixed with the parent code in the parent file.

In another example embodiment, implementation of the edit in the child code includes adding a using statement to the child code. In accordance with this embodiment, updating the parent code to include the change at step 206 includes adding a using directive, which includes a semantic equivalent of the using statement, in the updated parent code. A is said to be a semantic equivalent of B if A and B have the same semantic meaning.

In yet another example embodiment, implementation of the edit in the child code includes refactoring a fragment of the child code into a local function. For instance, refactoring the fragment into the local function may include restructuring the fragment to be included in the local function without changing functionality of the fragment. In accordance with this embodiment, updating the parent code to include the change at step 206 includes adding a semantic equivalent of the fragment to a directive in the updated parent code. For example, the directive may have the following format: @{ . . . }. In accordance with this example, the directive may be an @code directive or an @functions directive.

In still another example embodiment, implementation of the edit in the child code includes adding a method to the child code. In accordance with this embodiment, updating the parent code to include the change at step 206 includes adding a semantic equivalent of the method to a directive in the updated parent code. As described above, the directive may be an @code directive or an @functions directive.

In some example embodiments, one or more steps 202, 204, and/or 206 of flowchart 200 may not be performed. Moreover, steps in addition to or in lieu of steps 202, 204, and/or 206 may be performed. For instance, in an example embodiment, the method of flowchart 200 further includes compiling the updated parent code, which automatically triggers generation of the updated version of the child code that includes the semantic meaning of the edit. Accordingly, the updated parent code may be configured to cause the updated version of the child code to be automatically generated. In an example implementation, the compiler 612 compiles the updated parent code 630, which automatically triggers generation of the updated version of the child code that includes the semantic meaning of the edit.

In yet another example embodiment, the method of flowchart 200 further includes determining a first semantic meaning of the child code prior to implementation of the edit and a second semantic meaning of the child code after implementation of the edit by using a service associated with the child code to analyze the child code. In an example implementation, the semantic analysis logic 618 determines a first semantic meaning of the child code 624 prior to implementation of the edit and a second semantic meaning of the child code 624 after implementation of the edit by using the service associated with the child code 624 to analyze the child code 624. In accordance with this embodiment, translating the edit from the child computer language to the parent computer language at step 206 includes updating the parent code to include the change based on a difference between the first semantic meaning and the second semantic meaning.

Figure 3:
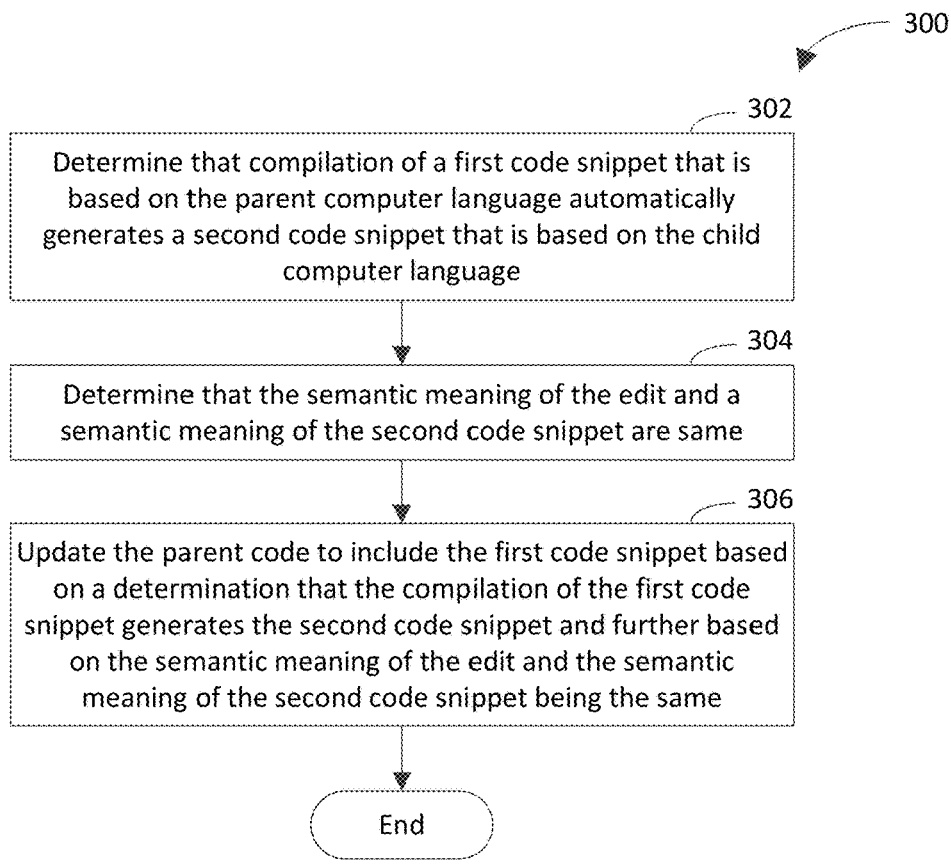

In still another example embodiment, the method of flowchart 200 further includes one or more of the steps shown in flowchart 300 of FIG. 3. As shown in FIG. 3, the method of flowchart 300 begins at step 302. In step 302, a determination is made that compilation of a first code snippet that is based on the parent computer language automatically generates a second code snippet that is based on the child computer language. In an example implementation, the code update logic 616 determines that compilation of the first code snippet automatically generates the second code snippet. For example, the code update logic 616 may analyze the code snippet information 628 to make the determination. In accordance with this example, the code snippet information 628 may cross-reference a first set of code snippets that are based on the parent code language with a second set of code snippets that are based on the child computer language and that are automatically generated by compilation of the respective code snippets in the first set. In further accordance with this example, the code update logic 616 may analyze the code snippet information 628 to determine that the first code snippet, which is included in the first set, automatically generates the second code snippet, which is included in the second set, based on the first code snippet being cross-referenced with the second code snippet.

At step 304, a determination is made that the semantic meaning of the edit and a semantic meaning of the second code snippet are same. In an example implementation, the semantic analysis logic 618 determines that the semantic meaning of the edit and the semantic meaning of the second code snippet are the same. For instance, the semantic analysis logic 618 may analyze the edit information 626 to determine the semantic meaning of the edit. The semantic analysis logic 618 may analyze the code snippet information 628 to determine the semantic meaning of the second code snippet. For example, the code snippet information 628 may indicate (e.g., include) a syntax of the second code snippet. In accordance with this example, the semantic analysis logic 618 may determine the semantic meaning of the second code snippet by analyzing the syntax of the second code snippet, as indicated by the code snippet information 628. The semantic analysis logic 618 may compare the semantic meaning of the edit, as indicated by the edit information 626, and the semantic meaning of the second code snippet, as indicated by the code snippet information 628, to determine that the semantic meaning of the edit and the semantic meaning of the second code snippet are the same.

In accordance with this embodiment, step 206 of flowchart 200 includes step 306. At step 306, the parent code is updated to include the first code snippet based on a determination that the compilation of the first code snippet generates the second code snippet and further based on the semantic meaning of the edit and the semantic meaning of the second code snippet being the same. In an example implementation, the code update logic 616 updates the parent code to include the first code snippet based on the determination that the compilation of the first code snippet generates the second code snippet and further based on the semantic meaning of the edit and the semantic meaning of the second code snippet being the same.

Figure 4:
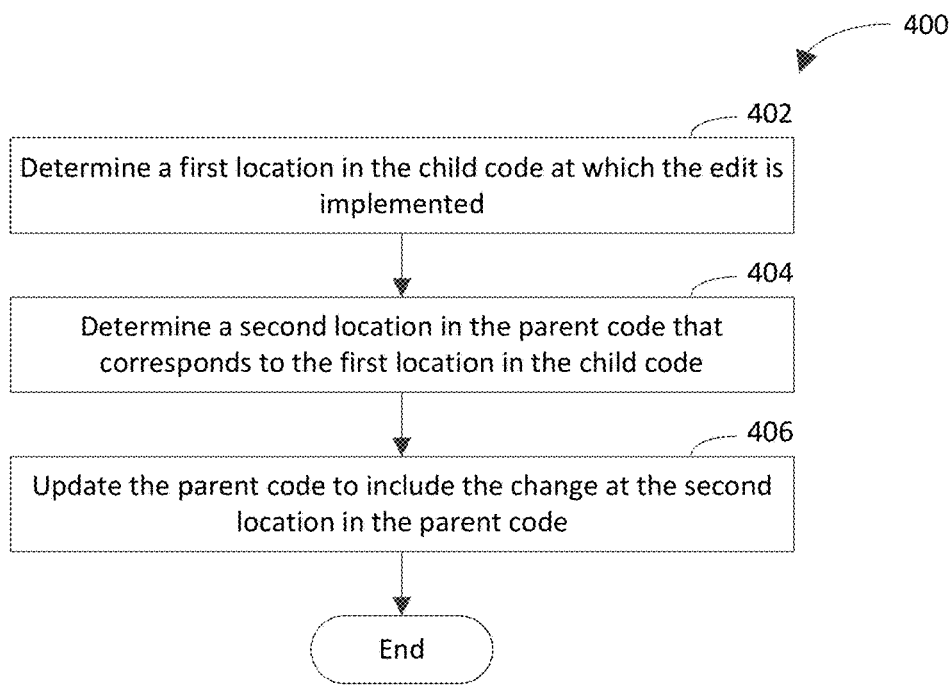

In yet another example embodiment, the method of flowchart 200 further includes one or more of the steps shown in flowchart 400 of FIG. 4. As shown in FIG. 4, the method of flowchart 400 begins at step 402. In step 402, a first location in the child code at which the edit is implemented is determined. In an example implementation, the location correspondence logic 620 determines the first location. For instance, the location correspondence logic 620 may analyze the edit information 626, which indicates the first location in the child code at which the edit is implemented, to determine the first location.

At step 404, a second location in the parent code that corresponds to the first location in the child code is determined. Each of the first location and the second location may be a line number or a subroutine, for example. In an example implementation, the location correspondence logic 620 determines the second location in the parent code that corresponds to the first location in the child code. For instance, the code snippet information 628 may indicate which lines of the parent code correspond to which lines of the child code. The location correspondence logic 620 may traverse the code snippet information 628 to identify the first location (e.g., line) in the child code and use the first location as a reference to identify the second location (e.g., line) in the parent code.

In accordance with this embodiment, step 206 of flowchart 200 includes step 406. At step 406, the parent code is updated to include the change at the second location in the parent code. In an example implementation, the code update logic 616 updates the parent code 622 to include the change at the second location in the parent code 622, resulting in the updated parent code 630.

In still another example embodiment, translating the edit from the child computer language to the parent computer language at step 206 includes determining whether the parent code includes a directive within a designated proximity of a location (e.g., within a designated number of lines from the location) in the parent code that corresponds to a location of the edit in the child code. If so, the content of the edit may be added to the directive. If not, a new directive may be created in the parent code, and the content of the edit may be inserted in the new directive. In an example implementation, the location correspondence logic 620 determines whether the parent code 622 includes a directive within the designated proximity of the location in the parent code 622 that corresponds to the location of the edit in the child code 624. The location correspondence logic 620 may generate a location indicator to indicate whether the parent code 622 includes a directive within the designated proximity of the location in the parent code 622 that corresponds to the location of the edit in the child code 624. For instance, the location indicator may have a first value (e.g., "1") if the parent code 622 includes a directive within the designated proximity of the location in the parent code 622 that corresponds to the location of the edit in the child code 624. Otherwise, the location indicator may have a second value (e.g., "0"), which is different from the first value. In accordance with this implementation, the code update logic 616 is configured to add the content of the edit to an existing directive in the parent code 622 based on the location indicator having the first value (e.g., as a result of the existing directive being within the designated proximity of the location in the parent code 622 that corresponds to the location of the edit in the child code 624). The code update logic 616 is further configured to create a new directive in the parent code 622 and insert the content of the edit in the new directive based on the location indicator having the second value (e.g., as a result of the parent code 622 not including a directive within the designated proximity of the location in the parent code 622 that corresponds to the location of the edit in the child code 624).

In an aspect of this embodiment, translating the edit from the child computer language to the parent computer language at step 206 further includes associating the edit with a "render" method of a parent file that includes the parent code. In accordance with this aspect, determining whether the parent code includes a directive within the designated proximity of the location in the parent code that corresponds to the location of the edit in the child code is performed as a result of associating the edit with the "render" method. In an example implementation, the code update logic 616 associates the edit with the "render" method.

In another aspect of this embodiment, translating the edit from the child computer language to the parent computer language at step 206 further includes determining that the edit is implemented in a class body of the child code. In accordance with this aspect, determining whether the parent code includes a directive within the designated proximity of the location in the parent code that corresponds to the location of the edit in the child code is performed as a result of determining that the edit is implemented in a class body of the child code. In an example implementation, the code update logic 616 determines that the edit is implemented in a class body of the child code.

Figure 5:
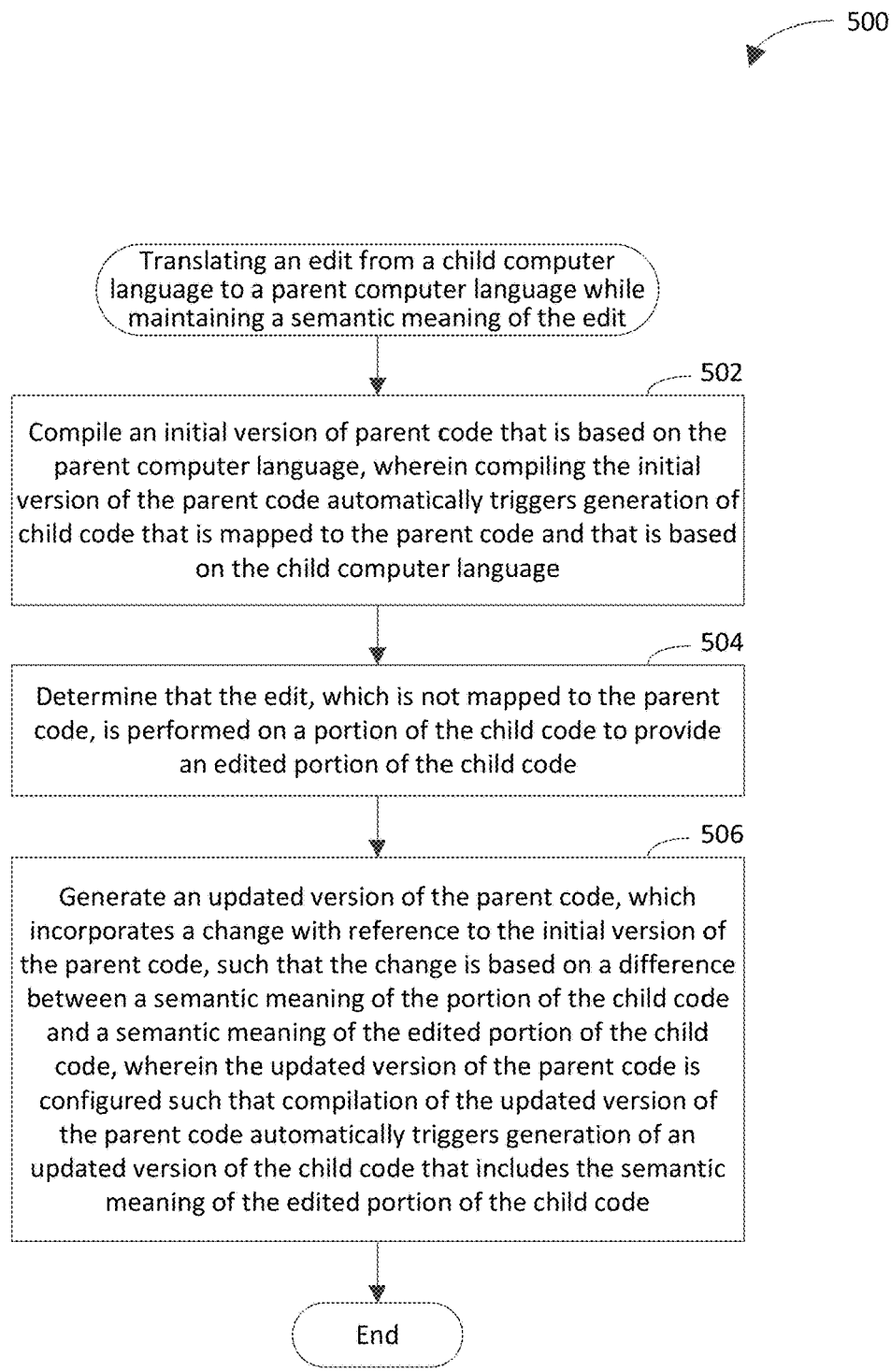
Figure 6:
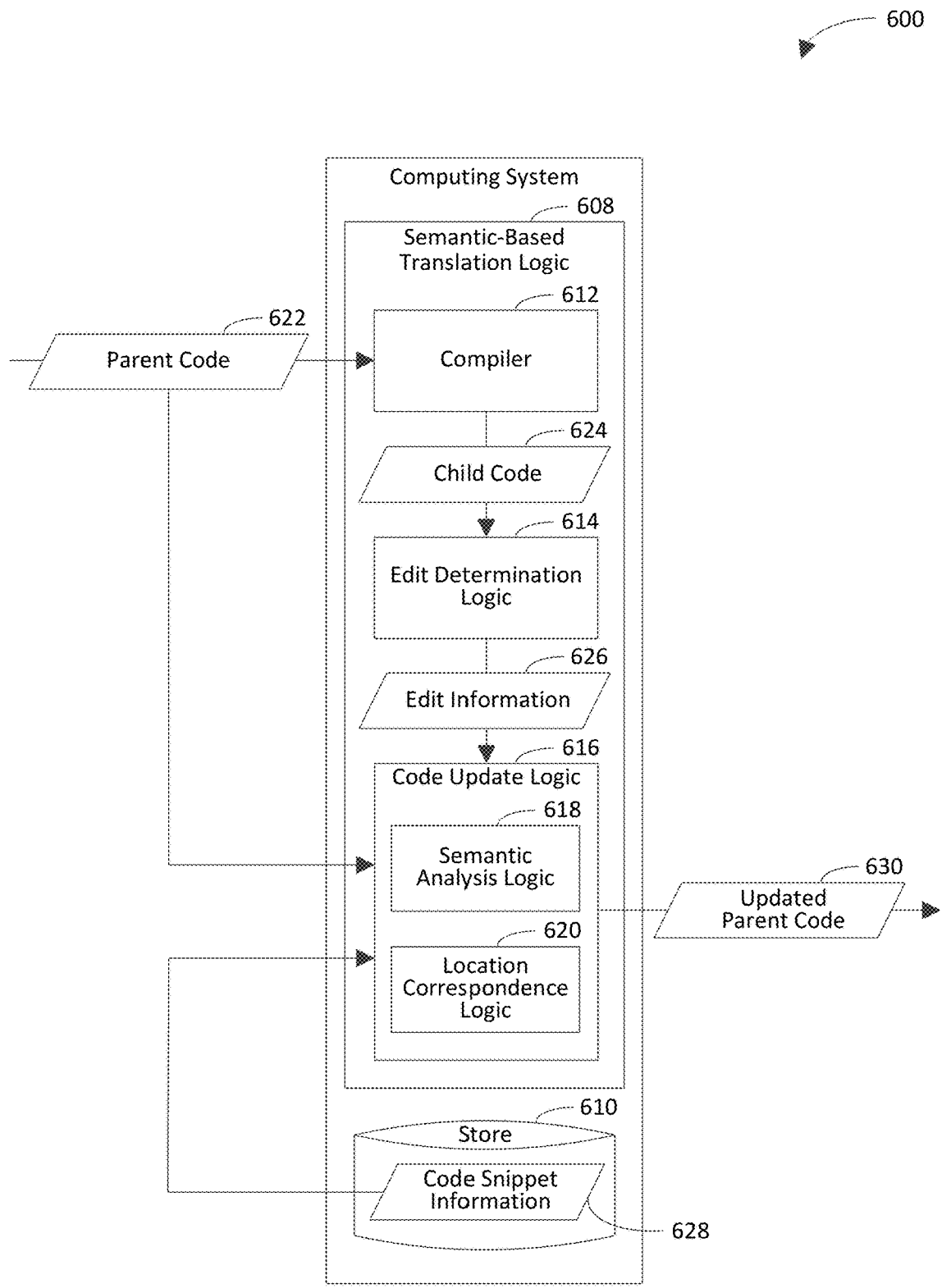
FIG. 6 is a block diagram of an example computing system in accordance with an embodiment.

As shown in FIG. 5, the method of flowchart 500 begins at step 502. In step 502, an initial version of parent code that is based on the parent computer language is compiled. Compiling the initial version of the parent code automatically at step 502 triggers generation of child code that is mapped to the parent code and that is based on the child computer language. The child computer language may be an embedded computer language that is embedded in the parent computer language, though the example embodiments are not limited in this respect. In an example implementation, the compiler 612 compiles an initial version of the parent code 622, which is based on the parent computer language. By compiling the initial version of the parent code, the compiler 612 automatically triggers generation of the child code 624, which is mapped to the parent code 622 and which is based on the child computer language.

In an example embodiment, the parent computer language is Razor, and the child computer language is C#. In another example embodiment, the parent computer language is XAML, and the child computer language is C#. In yet another example embodiment, the parent computer language is HTML, and the child computer language is JavaScript®. In still another example embodiment, the parent computer language is TypeScript, and the child computer language is JavaScript®.

At step 504, a determination is made that the edit, which is not mapped to the parent code, is performed (e.g., manually performed) on a portion of the child code to provide an edited portion of the child code. In an example implementation, the edit determination logic 614 determines that the edit is performed on a portion of the child code 624, resulting in the edited portion of the child code. In accordance with this implementation, the edit is not mapped to the parent code 622.

At step 506, an updated version of the parent code, which incorporates a change with reference to the initial version of the parent code, is generated such that the change is based on a difference between a semantic meaning of the portion of the child code and a semantic meaning of the edited portion of the child code. For instance, the edit that is performed on the portion of the child code and the change that is incorporated by the updated version of the parent code may be semantically equivalent. The updated version of the parent code is configured such that compilation of the updated version of the parent code automatically triggers generation of an updated version of the child code that includes the semantic meaning of the edited portion of the child code. In an example implementation, the code update logic 616 generates the updated parent code 630, which is the updated version of the parent code 622. The updated parent code 630 incorporates the change with reference to the initial version of the parent code 622. The code update logic 616 configures the updated parent code 630 to, as a result of the updated parent code 630 being compiled, automatically trigger generation of the updated version of the child code, which includes the semantic meaning of the edited portion of the child code.

In an example embodiment, the semantic analysis logic 618 analyzes the edit information 626 to determine the semantic meaning of the portion of the child code 626 (i.e., the semantic meaning of the portion before the edit is performed) and the semantic meaning of the edited portion of the child code 626 (i.e., the semantic meaning of the edited portion after the edit is performed). For instance, the semantic analysis logic 618 may analyze a syntax of the portion of the child code before and after the edit is performed, a context of the edit, and other relevant information to determine the semantic meaning of the portion of the child code and the semantic meaning of the edited portion of the child code. The semantic analysis logic 618 may determine the semantic meaning of the portion of the child code and the semantic meaning of the edited portion of the child code based on rules for interpreting the syntax of the portion and the edited portion that constrain the possible interpretations thereof. The semantic analysis logic 618 may use any suitable technique for determining the semantic meanings of the portion of the child code and the edited portion of the child code, respectively, including but not limited to an operational semantics technique, a denotational semantics technique, and/or an axiomatic semantics technique. In accordance with the operational semantics technique, the semantic analysis logic 618 may determine the semantic meanings of the portion and the edited portion based on the respective computations that the portion and the edited portion induce when the portion and the edited portion are executed on a machine. In accordance with the denotational semantics technique, the semantic analysis logic 618 may determine the semantic meanings of the portion and the edited portion, respectively, by using mathematical objects that represent the effects of executing the portion and the edited portion to model the respective semantic meanings.

In another example embodiment, basing the change, which is incorporated into the updated version of the parent code, on the difference between the semantic meaning of the portion of the child code and the semantic meaning of the edited portion of the child code as set forth in step 506 reduces an amount of time and/or resources (e.g., processor cycles, memory, network bandwidth) that is consumed to modify the parent code to incorporate functionality that results in the desired edit in the child code. In yet another example embodiment, basing the change on the difference between the semantic meaning of the portion of the child code and the semantic meaning of the edited portion of the child code as set forth in step 506 increases efficiency of a computing system (e.g., computing system 600) that is used to update the parent code (e.g., by automating the updating of the parent code).

In another example embodiment, the initial version of the parent code is included in a parent file that further includes multiple code snippets that are based on respective child computer languages. In accordance with this embodiment, compiling the initial version of the parent code at step 502 includes automatically triggering generation of child files that include the respective code snippets. In further accordance with this embodiment, a designated child file of the child files includes the child code. In an aspect of this embodiment, the child code includes a designated code snippet of the code snippets. In accordance with this aspect, the portion of the child code on which the edit is performed is separate from (e.g., not included in) the designated code snippet.

In yet another example embodiment, performance of the edit on the portion of the child code includes adding a using statement to the portion of the child code. In accordance with this embodiment, incorporation of the change in the updated version of the parent code includes adding a using directive, which includes a semantic equivalent of the using statement, in the updated version of the parent code.

In still another example embodiment, performance of the edit on the portion of the child code includes refactoring the portion of the child code into a local function. In accordance with this embodiment, incorporation of the change in the updated version of the parent code includes adding a semantic equivalent of the portion to a directive in the updated version of the parent code.

In another example embodiment, performance of the edit on the portion of the child code includes adding a method to the portion of the child code. In accordance with this embodiment, incorporation of the change in the updated version of the parent code includes adding a semantic equivalent of the portion to a directive in the updated version of the parent code.

In some example embodiments, one or more steps 502, 504, and/or 506 of flowchart 500 may not be performed. Moreover, steps in addition to or in lieu of steps 502, 504, and/or 506 may be performed. For instance, in an example embodiment, the method of flowchart 200 further includes compiling the updated version of the parent code, which automatically triggers generation of an updated version of the child code that includes the semantic meaning of the edited portion of the child code. Accordingly, the updated version of the parent code may be configured to cause the updated version of the child code to be automatically generated. In an example implementation, the compiler 612 compiles the updated parent code 630, which automatically triggers generation of an updated version of the child code that includes the semantic meaning of the edited portion of the child code.

In another example embodiment, the method of flowchart 500 further includes determining a first semantic meaning of a first version of the child code, which includes the portion of the child code, by using a service associated with the child code to analyze the child code prior to the edit being performed. In an example implementation, the semantic analysis logic 618 determines a first semantic meaning of a first version of the child code 624, which includes the portion of the child code 624, by using a service associated with the child code 624 to analyze the child code 624 prior to the edit being performed. In accordance with this embodiment, the method of flowchart 500 further includes determining a second semantic meaning of a second version of the child code, which includes the edited portion of the child code, by using the service associated with the child code to analyze the child code after the edit is performed. In an example implementation, the semantic analysis logic 618 determines a second semantic meaning of a second version of the child code 624, which includes the edited portion of the child code 624, by using the service associated with the child code 624 to analyze the child code 624 after the edit is performed. In further accordance with this embodiment, generating the updated version of the parent code at step 506 is based on a difference between the first semantic meaning and the second semantic meaning.

In yet another example embodiment, the method of flowchart 500 further includes steps 302 and 304 shown in flowchart 300 of FIG. 3. In accordance with this embodiment, the updated version of the parent code is generated at step 506 based on a determination that the compilation of the first code snippet generates the second code snippet and further based on the semantic meaning of the edit and the semantic meaning of the second code snippet being the same.

In still another example embodiment, the method of flowchart 500 further includes steps 402 and 404 shown in flowchart 400 of FIG. 4. In accordance with this embodiment, the updated version of the parent code is generated at step 506 to incorporate the change at the second location in the parent code.

It will be recognized that the computing system 600 may not include one or more of the semantic-based translation logic 608, the store 610, the compiler 612, the edit determination logic 614, the code update logic 616, the semantic analysis logic 618, and/or the location correspondence logic 620. Furthermore, the computing system 600 may include components in addition to or in lieu of the semantic-based translation logic 608, the store 610, the compiler 612, the edit determination logic 614, the code update logic 616, the semantic analysis logic 618, and/or the location correspondence logic 620.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the semantic-based translation logic 108, the semantic-based translation logic 608, the store 610, the compiler 612, the edit determination logic 614, the code update logic 616, the semantic analysis logic 618, the location correspondence logic 620, flowchart 200, flowchart 300, flowchart 400, and/or flowchart 500 may be implemented in hardware, software, firmware, or any combination thereof.

For example, any one or more of the semantic-based translation logic 108, the semantic-based translation logic 608, the store 610, the compiler 612, the edit determination logic 614, the code update logic 616, the semantic analysis logic 618, the location correspondence logic 620, flowchart 200, flowchart 300, flowchart 400, and/or flowchart 500 may be implemented, at least in part, as computer program code configured to be executed in one or more processors.

In another example, any one or more of the semantic-based translation logic 108, the semantic-based translation logic 608, the store 610, the compiler 612, the edit determination logic 614, the code update logic 616, the semantic analysis logic 618, the location correspondence logic 620, flowchart 200, flowchart 300, flowchart 400, and/or flowchart 500 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 7:
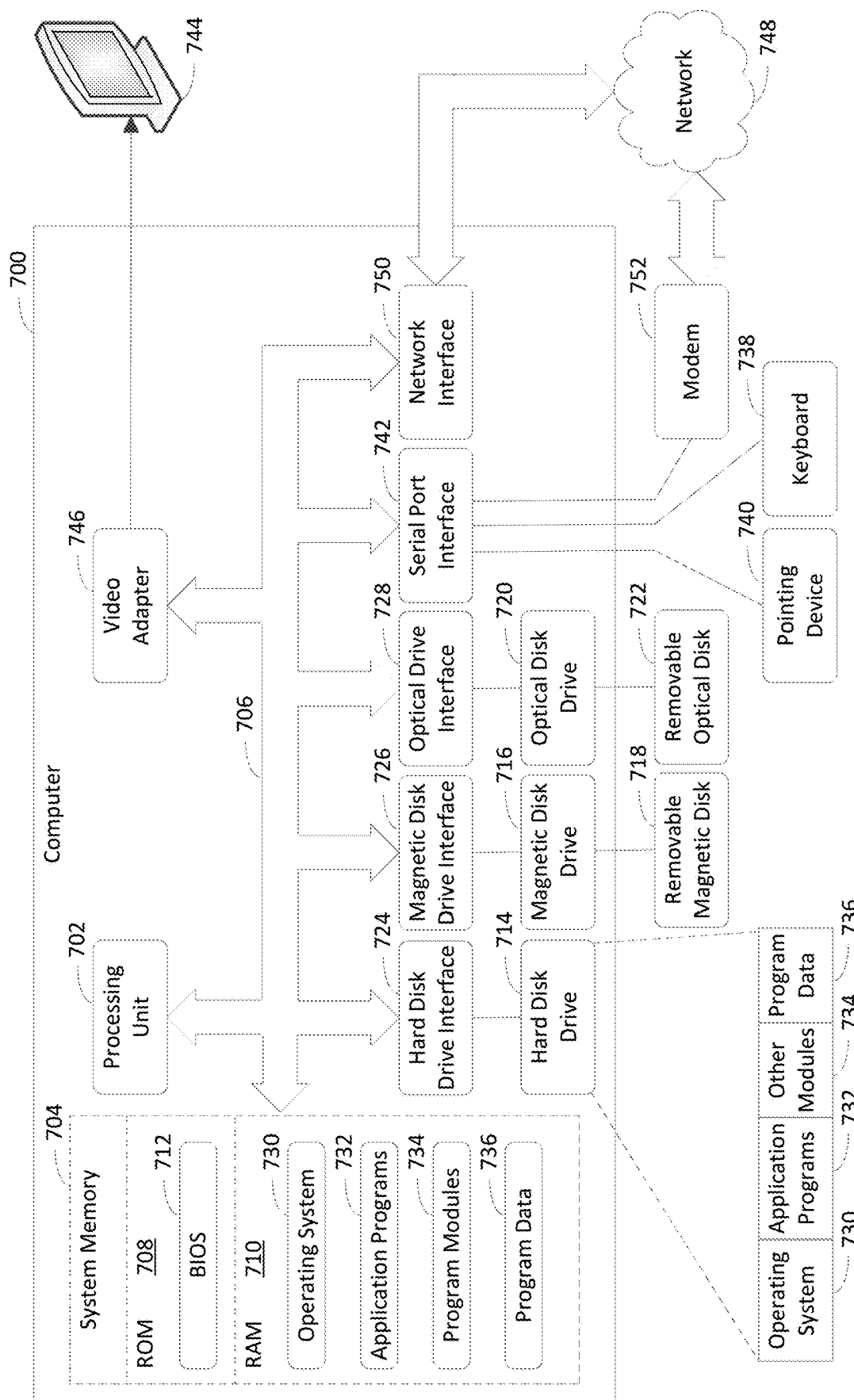
FIG. 7 depicts an example computer in which embodiments may be implemented.

III. Further Discussion of Some Example Embodiments (A1) A first example system (FIG. 1, 102A-102M or 106A-106N; FIG. 6, 600; FIG. 7, 700) to translate an edit from a child computer language to a parent computer language while maintaining a semantic meaning of the edit comprises a memory (FIG. 7, 704, 708, 710) and a processing system (FIG. 7, 702) coupled to the memory. The processing system is configured to compile (FIG. 2, 202) parent code (FIG. 6, 622) that is based on the parent computer language, which automatically triggers generation of child code (FIG. 6, 624) that is mapped to the parent code and that is based on the child computer language. The processing system is further configured to determine (FIG. 2, 204) that the edit, which is not mapped to the parent code, is implemented in the child code to provide edited child code. The processing system is further configured to translate (FIG. 2, 206) the edit from the child computer language to the parent computer language by updating the parent code to include a change that is based on the semantic meaning of the edit. The updated parent code (FIG. 6, 630) is configured such that compilation of the updated parent code automatically triggers generation of an updated version of the child code that includes the semantic meaning of the edit.

(A2) In the example system of A1, wherein the processing system is configured to: determine that compilation of a first code snippet that is based on the parent computer language automatically generates a second code snippet that is based on the child computer language; determine that the semantic meaning of the edit and a semantic meaning of the second code snippet are same; and update the parent code to include the first code snippet based on a determination that the compilation of the first code snippet generates the second code snippet and further based on the semantic meaning of the edit and the semantic meaning of the second code snippet being the same.

(A3) In the example system of any of A1-A2, wherein the processing system is configured to: determine a first location in the child code at which the edit is implemented; determine a second location in the parent code that corresponds to the first location in the child code; and update the parent code to include the change at the second location in the parent code.

(A4) In the example system of any of A1-A3, wherein the parent code is included in a parent file that further includes a plurality of code snippets that are based on a plurality of respective child computer languages; wherein the processing system is configured to: automatically trigger generation of a plurality of child files that include the plurality of respective code snippets by compiling the parent code; and wherein a designated child file of the plurality of child files includes the child code.

(A5) In the example system of any of A1-A4, wherein the child code includes a designated code snippet of the plurality of code snippets; and wherein a portion of the child code in which the edit is implemented is separate from the designated code snippet.

(A6) In the example system of any of A1-A5, wherein the processing system is configured to: determine a first semantic meaning of the child code prior to implementation of the edit and a second semantic meaning of the child code after implementation of the edit by using a service associated with the child code to analyze the child code; and update the parent code to include the change based on a difference between the first semantic meaning and the second semantic meaning.

(A7) In the example system of any of A1-A6, wherein the child computer language is an embedded computer language that is embedded in the parent computer language.

(A8) In the example system of any of A1-A7, wherein the parent computer language is a Razor computer language, and wherein the child computer language is a C# computer language.

(A9) In the example system of any of A1-A8, wherein implementation of the edit in the child code includes adding a using statement to the child code; and wherein the processing system is configured to: update the parent code to include the change by adding a using directive, which includes a semantic equivalent of the using statement, in the updated parent code.

(A10) In the example system of any of A1-A9, wherein implementation of the edit in the child code includes refactoring a fragment of the child code into a local function; and wherein the processing system is configured to: update the parent code to include the change by adding a semantic equivalent of the fragment to a directive in the updated parent code.

(A11) In the example system of any of A1-A10, wherein implementation of the edit in the child code includes adding a method to the child code; and wherein the processing system is configured to update the parent code to include the change by adding a semantic equivalent of the method to a directive in the updated parent code.

(A12) In the example system of any of A1-A11, wherein the parent computer language is an extensible application markup language (XAML) computer language, and wherein the child computer language is a C# computer language.

(A13) In the example system of any of A1-A12, wherein the parent computer language is a hypertext markup language (HTML) computer language, and wherein the child computer language is a JavaScript computer language.

(A14) In the example system of any of A1-A13, wherein the parent computer language is a TypeScript computer language, and wherein the child computer language is a JavaScript computer language.

(B1) A second example system (FIG. 1, 102A-102M or 106A-106N; FIG. 6, 600; FIG. 7, 700) to translate an edit from a child computer language to a parent computer language while maintaining a semantic meaning of the edit comprises a memory (FIG. 7, 704, 708, 710) and a processing system (FIG. 7, 702) coupled to the memory. The processing system is configured to compile (FIG. 5, 502) an initial version of parent code (FIG. 6, 622) that is based on the parent computer language, which automatically triggers generation of child code (FIG. 6, 624) that is mapped to the parent code and that is based on the child computer language. The processing system is further configured to determine (FIG. 5, 504) that the edit, which is not mapped to the parent code, is performed on a portion of the child code to provide an edited portion of the child code. The processing system is further configured to generate (FIG. 5, 506) an updated version of the parent code (FIG. 6, 630), which incorporates a change with reference to the initial version of the parent code, such that the change is based on a difference between a semantic meaning of the portion of the child code and a semantic meaning of the edited portion of the child code. The updated version of the parent code is configured such that compilation of the updated version of the parent code automatically triggers generation of an updated version of the child code that includes the semantic meaning of the edited portion of the child code.

(B2) In the example system of B1, wherein the processing system is configured to: determine that compilation of a first code snippet that is based on the parent computer language automatically generates a second code snippet that is based on the child computer language; determine that the semantic meaning of the edit and a semantic meaning of the second code snippet are same; and generate the updated version of the parent code to incorporate the first code snippet based on a determination that the compilation of the first code snippet generates the second code snippet and further based on the semantic meaning of the edit and the semantic meaning of the second code snippet being the same.

(B3) In the example system of any of B1-B2, wherein the processing system is configured to: determine a first location in the child code at which the edit is performed; determine a second location in the parent code that corresponds to the first location in the child code; and generate the updated version of the parent code to incorporate the change at the second location in the parent code.

(B4) In the example system of any of B1-B3, wherein the initial version of the parent code is included in a parent file that further includes a plurality of code snippets that are based on a plurality of respective child computer languages; wherein the processing system is configured to: automatically trigger generation of a plurality of child files that include the plurality of respective code snippets by compiling the initial version of the parent code; and wherein a designated child file of the plurality of child files includes the child code.

(B5) In the example system of any of B1-B4, wherein the child code includes a designated code snippet of the plurality of code snippets; and wherein the portion of the child code on which the edit is performed is separate from the designated code snippet.

(B6) In the example system of any of B1-B5, wherein the processing system is configured to: determine a first semantic meaning of a first version of the child code, which includes the portion of the child code, by using a service associated with the child code to analyze the child code prior to the edit being performed; determine a second semantic meaning of a second version of the child code, which includes the edited portion of the child code, by using the service associated with the child code to analyze the child code after the edit is performed; and generate the updated version of the parent code to incorporate the change based on a difference between the first semantic meaning and the second semantic meaning.

(B7) In the example system of any of B1-B6, wherein the child computer language is an embedded computer language that is embedded in the parent computer language.

(B8) In the example system of any of B1-B7, wherein the parent computer language is a Razor computer language, and wherein the child computer language is a C# computer language.

(B9) In the example system of any of B1-B8, wherein performance of the edit on the portion of the child code includes adding a using statement to the portion of the child code; and wherein incorporation of the change in the updated version of the parent code includes adding a using directive, which includes a semantic equivalent of the using statement, in the updated version of the parent code.

(B10) In the example system of any of B1-B9, wherein performance of the edit on the portion of the child code includes refactoring the portion of the child code into a local function; and wherein incorporation of the change in the updated version of the parent code includes adding a semantic equivalent of the portion to a directive in the updated version of the parent code.

(B11) In the example system of any of B1-B10, wherein performance of the edit on the portion of the child code includes adding a method to the portion of the child code; and wherein incorporation of the change in the updated version of the parent code includes adding a semantic equivalent of the portion to a directive in the updated version of the parent code.

(B12) In the example system of any of B1-B11, wherein the parent computer language is an extensible application markup language (XAML) computer language, and wherein the child computer language is a C# computer language.

(B13) In the example system of any of B1-B12, wherein the parent computer language is a hypertext markup language (HTML) computer language, and wherein the child computer language is a JavaScript computer language.

(B14) In the example system of any of B1-B13, wherein the parent computer language is a TypeScript computer language, and wherein the child computer language is a JavaScript computer language.

(C1) A first example method of translating an edit from a child computer language to a parent computer language while maintaining a semantic meaning of the edit comprises compiling (FIG. 2, 202) parent code (FIG. 6, 622) that is based on the parent computer language, wherein compiling the parent code automatically triggers generation of child code (FIG. 6, 624) that is mapped to the parent code and that is based on the child computer language. The method further comprises determining (FIG. 2, 204) that the edit, which is not mapped to the parent code, is implemented in the child code to provide edited child code. The method further comprises translating (FIG. 2, 206) the edit from the child computer language to the parent computer language by updating the parent code to include a change that is based on the semantic meaning of the edit. The updated parent code (FIG. 6, 630) is configured such that compilation of the updated parent code automatically triggers generation of an updated version of the child code that includes the semantic meaning of the edit.

(C2) In the method of C1, further comprising: determining that compilation of a first code snippet that is based on the parent computer language automatically generates a second code snippet that is based on the child computer language; and determining that the semantic meaning of the edit and a semantic meaning of the second code snippet are same; wherein translating the edit from the child computer language to the parent computer language comprises: updating the parent code to include the first code snippet based on a determination that the compilation of the first code snippet generates the second code snippet and further based on the semantic meaning of the edit and the semantic meaning of the second code snippet being the same.

(C3) In the method of any of C1-C2, further comprising: determining a first location in the child code at which the edit is implemented; and determining a second location in the parent code that corresponds to the first location in the child code; wherein translating the edit from the child computer language to the parent computer language comprises: updating the parent code to include the change at the second location in the parent code.

(C4) In the method of any of C1-C3, wherein the parent code is included in a parent file that further includes a plurality of code snippets that are based on a plurality of respective child computer languages; wherein compiling the parent code comprises: automatically triggering generation of a plurality of child files that include the plurality of respective code snippets; and wherein a designated child file of the plurality of child files includes the child code.

(C5) In the method of any of C1-C4, wherein the child code includes a designated code snippet of the plurality of code snippets; and wherein a portion of the child code in which the edit is implemented is separate from the designated code snippet.

(C6) In the method of any of C1-05, further comprising: determining a first semantic meaning of the child code prior to implementation of the edit and a second semantic meaning of the child code after implementation of the edit by using a service associated with the child code to analyze the child code; wherein translating the edit from the child computer language to the parent computer language comprises: updating the parent code to include the change based on a difference between the first semantic meaning and the second semantic meaning.

(C7) In the method of any of C1-C6, wherein the child computer language is an embedded computer language that is embedded in the parent computer language.

(C8) In the method of any of C1-C7, wherein the parent computer language is a Razor computer language, and wherein the child computer language is a C# computer language.

(C9) In the method of any of C1-C8, wherein implementation of the edit in the child code includes adding a using statement to the child code; and wherein updating the parent code to include the change comprises: adding a using directive, which includes a semantic equivalent of the using statement, in the updated parent code.

(C10) In the method of any of C1-C9, wherein implementation of the edit in the child code includes refactoring a fragment of the child code into a local function; and wherein updating the parent code to include the change comprises: adding a semantic equivalent of the fragment to a directive in the updated parent code.

(C11) In the method of any of C1-C10, wherein implementation of the edit in the child code includes adding a method to the child code; and wherein updating the parent code to include the change comprises: adding a semantic equivalent of the method to a directive in the updated parent code.

(C12) In the method of any of C1-C11, wherein the parent computer language is an extensible application markup language (XAML) computer language, and wherein the child computer language is a C# computer language.

(C13) In the method of any of C1-C12, wherein the parent computer language is a hypertext markup language (HTML) computer language, and wherein the child computer language is a JavaScript computer language.

(C14) In the method of any of C1-C13, wherein the parent computer language is a TypeScript computer language, and wherein the child computer language is a JavaScript computer language.

(D1) A second example method of translating an edit from a child computer language to a parent computer language while maintaining a semantic meaning of the edit comprises compiling (FIG. 5, 502) an initial version of parent code (FIG. 6, 622) that is based on the parent computer language, wherein compiling the initial version of the parent code automatically triggers generation of child code (FIG. 6, 624) that is mapped to the parent code and that is based on the child computer language. The method further comprises determining (FIG. 5, 504) that the edit, which is not mapped to the parent code, is performed on a portion of the child code to provide an edited portion of the child code. The method further comprises generating (FIG. 5, 506) an updated version of the parent code (FIG. 6, 630), which incorporates a change with reference to the initial version of the parent code, such that the change is based on a difference between a semantic meaning of the portion of the child code and a semantic meaning of the edited portion of the child code. The updated version of the parent code is configured such that compilation of the updated version of the parent code automatically triggers generation of an updated version of the child code that includes the semantic meaning of the edited portion of the child code.

(D2) In the method of D1, further comprising: determining that compilation of a first code snippet that is based on the parent computer language automatically generates a second code snippet that is based on the child computer language; and determining that the semantic meaning of the edit and a semantic meaning of the second code snippet are same; wherein generating the updated version of the parent code comprises: generating the updated version of the parent code to incorporate the first code snippet based on a determination that the compilation of the first code snippet generates the second code snippet and further based on the semantic meaning of the edit and the semantic meaning of the second code snippet being the same.

(D3) In the method of any of D1-D2, further comprising: determining a first location in the child code at which the edit is performed; and determining a second location in the parent code that corresponds to the first location in the child code; wherein generating the updated version of the parent code comprises: generating the updated version of the parent code to incorporate the change at the second location in the parent code.

(D4) In the method of any of D1-D3, wherein the initial version of the parent code is included in a parent file that further includes a plurality of code snippets that are based on a plurality of respective child computer languages; wherein compiling the initial version of the parent code comprises: automatically triggering generation of a plurality of child files that include the plurality of respective code snippets; and wherein a designated child file of the plurality of child files includes the child code.

(D5) In the method of any of D1-D4, wherein the child code includes a designated code snippet of the plurality of code snippets; and wherein the portion of the child code on which the edit is performed is separate from the designated code snippet.

(D6) In the method of any of D1-D5, further comprising: determining a first semantic meaning of a first version of the child code, which includes the portion of the child code, by using a service associated with the child code to analyze the child code prior to the edit being performed; and determining a second semantic meaning of a second version of the child code, which includes the edited portion of the child code, by using the service associated with the child code to analyze the child code after the edit is performed; wherein generating the updated version of the parent code comprises: generating the updated version of the parent code to incorporate the change based on a difference between the first semantic meaning and the second semantic meaning.

(D7) In the method of any of D1-D6, wherein the child computer language is an embedded computer language that is embedded in the parent computer language.

(D8) In the method of any of D1-D7, wherein the parent computer language is a Razor computer language, and wherein the child computer language is a C# computer language.

(D9) In the method of any of D1-D8, wherein performance of the edit on the portion of the child code includes adding a using statement to the portion of the child code; and wherein incorporation of the change in the updated version of the parent code includes adding a using directive, which includes a semantic equivalent of the using statement, in the updated version of the parent code.

(D10) In the method of any of D1-D9, wherein performance of the edit on the portion of the child code includes refactoring the portion of the child code into a local function; and wherein incorporation of the change in the updated version of the parent code includes adding a semantic equivalent of the portion to a directive in the updated version of the parent code.

(D11) In the method of any of D1-D10, wherein performance of the edit on the portion of the child code includes adding a method to the portion of the child code; and wherein incorporation of the change in the updated version of the parent code includes adding a semantic equivalent of the portion to a directive in the updated version of the parent code.

(D12) In the method of any of D1-D11, wherein the parent computer language is an extensible application markup language (XAML) computer language, and wherein the child computer language is a C# computer language.

(D13) In the method of any of D1-D12, wherein the parent computer language is a hypertext markup language (HTML) computer language, and wherein the child computer language is a JavaScript computer language.

(D14) In the method of any of D1-D13, wherein the parent computer language is a TypeScript computer language, and wherein the child computer language is a JavaScript computer language.

(E1) An example computer program product (FIG. 7, 718, 722) comprising a computer-readable storage medium having instructions recorded thereon for enabling a processor-based system (FIG. 1, 102A-102M or 106A-106N; FIG. 6, 600; FIG. 7, 700) to translate an edit from a child computer language to a parent computer language while maintaining a semantic meaning of the edit by performing operations. The operations comprise compiling (FIG. 2, 202) parent code (FIG. 6, 622) that is based on the parent computer language, wherein compiling the parent code automatically triggers generation of child code (FIG. 6, 624) that is mapped to the parent code and that is based on the child computer language. The operations further comprise determining (FIG. 2, 204) that the edit, which is not mapped to the parent code, is implemented in the child code to provide edited child code. The operations further comprise translating (FIG. 2, 206) the edit from the child computer language to the parent computer language by updating the parent code to include a change that is based on the semantic meaning of the edit. The updated parent code (FIG. 6, 630) is configured such that compilation of the updated parent code automatically triggers generation of an updated version of the child code that includes the semantic meaning of the edit.

(F1) An example computer program product (FIG. 7, 718, 722) comprising a computer-readable storage medium having instructions recorded thereon for enabling a processor-based system (FIG. 1, 102A-102M or 106A-106N; FIG. 6, 600; FIG. 7, 700) to translate an edit from a child computer language to a parent computer language while maintaining a semantic meaning of the edit by performing operations. The operations comprise compiling (FIG. 5, 502) an initial version of parent code (FIG. 6, 622) that is based on the parent computer language, wherein compiling the initial version of the parent code automatically triggers generation of child code (FIG. 6, 624) that is mapped to the parent code and that is based on the child computer language. The operations further comprise determining (FIG. 5, 504) that the edit, which is not mapped to the parent code, is performed on a portion of the child code to provide an edited portion of the child code. The operations further comprise generating (FIG. 5, 506) an updated version of the parent code (FIG. 6, 630), which incorporates a change with reference to the initial version of the parent code, such that the change is based on a difference between a semantic meaning of the portion of the child code and a semantic meaning of the edited portion of the child code. The updated version of the parent code is configured such that compilation of the updated version of the parent code automatically triggers generation of an updated version of the child code that includes the semantic meaning of the edited portion of the child code.

IV. Example Computer System

FIG. 7 depicts an example computer 700 in which embodiments may be implemented. Any one or more of the user devices 102A-102M and/or any one or more of the servers 106A-106N shown in FIG. 1 and/or computing system 600 shown in FIG. 6 may be implemented using computer 700, including one or more features of computer 700 and/or alternative features. Computer 700 may be a general-purpose computing device in the form of a conventional personal computer, a mobile computer, or a workstation, for example, or computer 700 may be a special purpose computing device. The description of computer 700 provided herein is provided for purposes of illustration, and is not intended to be limiting. Embodiments may be implemented in further types of computer systems, as would be known to persons skilled in the relevant art(s).

As shown in FIG. 7, computer 700 includes a processing unit 702, a system memory 704, and a bus 706 that couples various system components including system memory 704 to processing unit 702. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computer 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 730, one or more application programs 732, other program modules 734, and program data 736. Application programs 732 or program modules 734 may include, for example, computer program logic for implementing any one or more of (e.g., at least a portion of) the semantic-based translation logic 108, the semantic-based translation logic 608, the compiler 612, the edit determination logic 614, the code update logic 616, the semantic analysis logic 618, the location correspondence logic 620, flowchart 200 (including any step of flowchart 200), flowchart 300 (including any step of flowchart 300), flowchart 400 (including any step of flowchart 400), and/or flowchart 500 (including any step of flowchart 500), as described herein.

A user may enter commands and information into the computer 700 through input devices such as keyboard 738 and pointing device 740. Other input devices (not shown) may include a microphone, joystick, game pad, satellite dish, scanner, touch screen, camera, accelerometer, gyroscope, or the like. These and other input devices are often connected to the processing unit 702 through a serial port interface 742 that is coupled to bus 706, but may be connected by other interfaces, such as a parallel port, game port, or a universal serial bus (USB).

A display device 744 (e.g., a monitor) is also connected to bus 706 via an interface, such as a video adapter 746. In addition to display device 744, computer 700 may include other peripheral output devices (not shown) such as speakers and printers.

Computer 700 is connected to a network 748 (e.g., the Internet) through a network interface or adapter 750, a modem 752, or other means for establishing communications over the network. Modem 752, which may be internal or external, is connected to bus 706 via serial port interface 742.

As used herein, the terms "computer program medium" and "computer-readable storage medium" are used to generally refer to media (e.g., non-transitory media) such as the hard disk associated with hard disk drive 714, removable magnetic disk 718, removable optical disk 722, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 732 and other program modules 734) may be stored on the hard disk, magnetic disk, optical disk, ROM, or RAM. Such computer programs may also be received via network interface 750 or serial port interface 742. Such computer programs, when executed or loaded by an application, enable computer 700 to implement features of embodiments discussed herein. Accordingly, such computer programs represent controllers of the computer 700.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system to translate an edit from a child computer language to a parent computer language while maintaining a semantic meaning of the edit, the system comprising:
    a memory; and
    a processing system coupled to the memory, the processing system configured to:
        compile parent code that is based on the parent computer language, which automatically triggers generation of child code that is mapped to the parent code and that is based on the child computer language;
        determine that the edit, which is not mapped to the parent code, is implemented in the child code to provide edited child code; and
        translate the edit from the child computer language to the parent computer language by updating the parent code to include a change that is based on the semantic meaning of the edit, the updated parent code configured such that compilation of the updated parent code automatically triggers generation of an updated version of the child code that includes the semantic meaning of the edit.

2. The system of claim 1, wherein the processing system is configured to:
    determine that compilation of a first code snippet that is based on the parent computer language automatically generates a second code snippet that is based on the child computer language;
    determine that the semantic meaning of the edit and a semantic meaning of the second code snippet are same; and update the parent code to include the first code snippet based on a determination that the compilation of the first code snippet generates the second code snippet and further based on the semantic meaning of the edit and the semantic meaning of the second code snippet being the same.

3. The system of claim 1, wherein the processing system is configured to:
   determine a first location in the child code at which the edit is implemented;
   determine a second location in the parent code that corresponds to the first location in the child code; and
   update the parent code to include the change at the second location in the parent code.

4. The system of claim 1, wherein the parent code is included in a parent file that further includes a plurality of code snippets that are based on a plurality of respective child computer languages;
   wherein the processing system is configured to:
      automatically trigger generation of a plurality of child files that include the plurality of respective code snippets by compiling the parent code; and
   wherein a designated child file of the plurality of child files includes the child code.

5. The system of claim 4, wherein the child code includes a designated code snippet of the plurality of code snippets; and
   wherein a portion of the child code in which the edit is implemented is separate from the designated code snippet.

6. The system of claim 1, wherein the processing system is configured to:
   determine a first semantic meaning of the child code prior to implementation of the edit and a second semantic meaning of the child code after implementation of the edit by using a service associated with the child code to analyze the child code; and
   update the parent code to include the change based on a difference between the first semantic meaning and the second semantic meaning.

7. The system of claim 1, wherein the child computer language is an embedded computer language that is embedded in the parent computer language.

8. The system of claim 1, wherein the parent computer language is a Razor computer language, and wherein the child computer language is a C# computer language.

9. The system of claim 1, wherein implementation of the edit in the child code includes adding a using statement to the child code; and
   wherein the processing system is configured to:
      update the parent code to include the change by adding a using directive, which includes a semantic equivalent of the using statement, in the updated parent code.

10. The system of claim 1, wherein implementation of the edit in the child code includes refactoring a fragment of the child code into a local function; and
    wherein the processing system is configured to:
       update the parent code to include the change by adding a semantic equivalent of the fragment to a directive in the updated parent code.

11. The system of claim 1, wherein implementation of the edit in the child code includes adding a method to the child code; and
    wherein the processing system is configured to update the parent code to include the change by adding a semantic equivalent of the method to a directive in the updated parent code.

12. The system of claim 1, wherein the parent computer language is an extensible application markup language (XAML) computer language, and wherein the child computer language is a C# computer language.

13. The system of claim 1, wherein the parent computer language is a hypertext markup language (HTML) computer language, and wherein the child computer language is a JavaScript computer language.

14. The system of claim 1, wherein the parent computer language is a TypeScript computer language, and wherein the child computer language is a JavaScript computer language.

15. A method of translating an edit from a child computer language to a parent computer language while maintaining a semantic meaning of the edit, the method comprising:
    compiling an initial version of parent code that is based on the parent computer language, wherein compiling the initial version of the parent code automatically triggers generation of child code that is mapped to the parent code and that is based on the child computer language;
    determining that the edit, which is not mapped to the parent code, is performed on a portion of the child code to provide an edited portion of the child code; and
    generating an updated version of the parent code, which incorporates a change with reference to the initial version of the parent code, such that the change is based on a difference between a semantic meaning of the portion of the child code and a semantic meaning of the edited portion of the child code, wherein the updated version of the parent code is configured such that compilation of the updated version of the parent code automatically triggers generation of an updated version of the child code that includes the semantic meaning of the edited portion of the child code.

16. The method of claim 15, further comprising:
    determining that compilation of a first code snippet that is based on the parent computer language automatically generates a second code snippet that is based on the child computer language; and
    determining that the semantic meaning of the edit and a semantic meaning of the second code snippet are same;
    wherein generating the updated version of the parent code comprises:
       generating the updated version of the parent code to incorporate the first code snippet based on a determination that the compilation of the first code snippet generates the second code snippet and further based on the semantic meaning of the edit and the semantic meaning of the second code snippet being the same.

17. The method of claim 15, further comprising:
    determining a first location in the child code at which the edit is performed; and
    determining a second location in the parent code that corresponds to the first location in the child code;
    wherein generating the updated version of the parent code comprises:
       generating the updated version of the parent code to incorporate the change at the second location in the parent code.

18. The method of claim 15, wherein the initial version of the parent code is included in a parent file that further includes a plurality of code snippets that are based on a plurality of respective child computer languages;
  wherein compiling the initial version of the parent code comprises:
    automatically triggering generation of a plurality of child files that include the plurality of respective code snippets;
  wherein a designated child file of the plurality of child files includes the child code;
  wherein the child code includes a designated code snippet of the plurality of code snippets; and
  wherein the portion of the child code on which the edit is performed is separate from the designated code snippet.

19. The method of claim 15, wherein the child computer language is an embedded computer language that is embedded in the parent computer language.

20. A computer program product comprising a computer-readable storage medium having instructions recorded thereon for enabling a processor-based system to translate an edit from a child computer language to a parent computer language while maintaining a semantic meaning of the edit by performing operations, the operations comprising:
  compiling parent code that is based on the parent computer language, wherein compiling the parent code automatically triggers generation of child code that is mapped to the parent code and that is based on the child computer language;
  determining that the edit, which is not mapped to the parent code, is implemented in the child code to provide edited child code; and
  translating the edit from the child computer language to the parent computer language by updating the parent code to include a change that is based on the semantic meaning of the edit, the updated parent code configured such that compilation of the updated parent code automatically triggers generation of an updated version of the child code that includes the semantic meaning of the edit.

* * * * *